Feb. 20, 1934.   A. W. BOLSTER   1,947,637
CONTROL VALVE
Filed Aug. 4, 1930   2 Sheets-Sheet 1
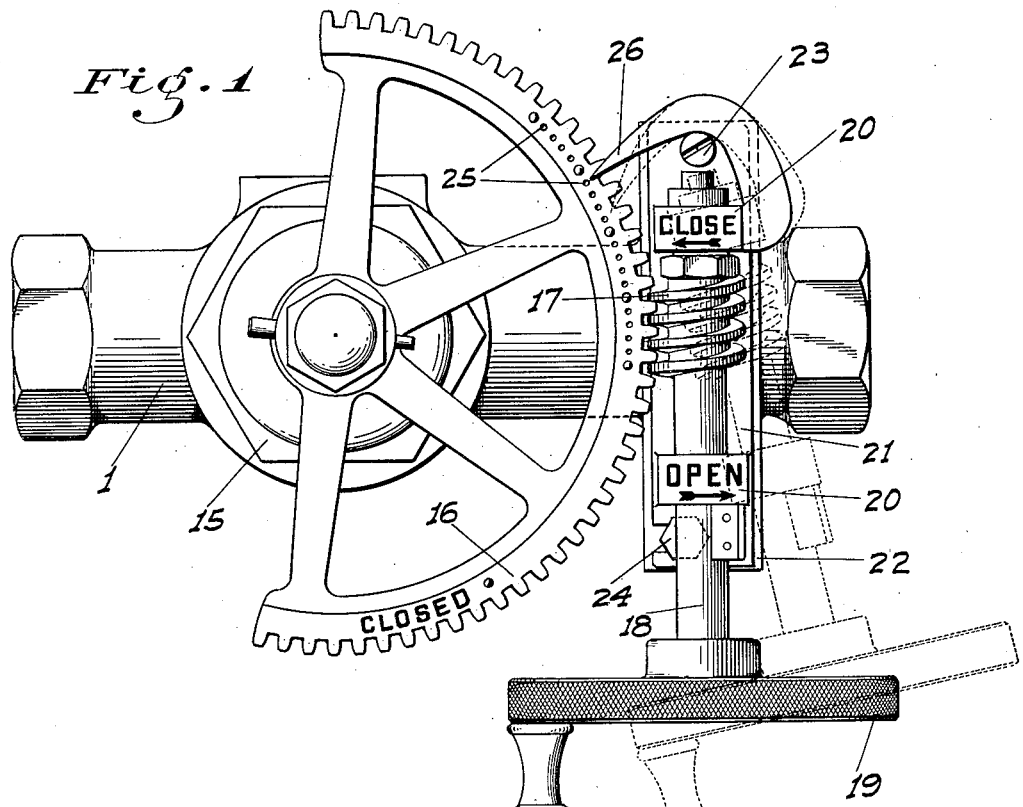
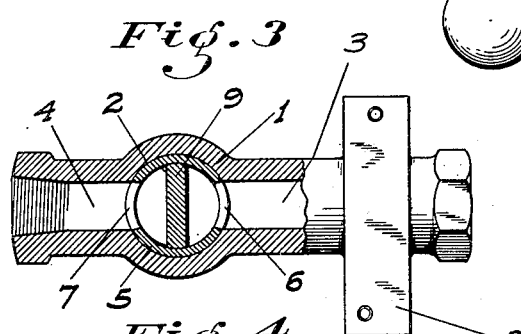
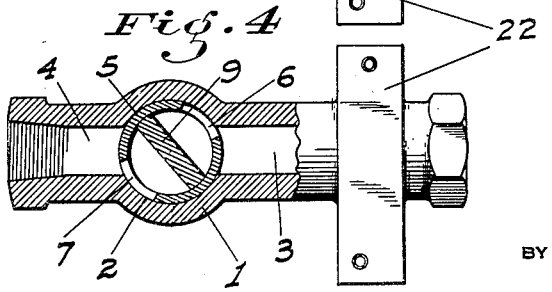
INVENTOR
A. W. Bolster
BY
ATTORNEY

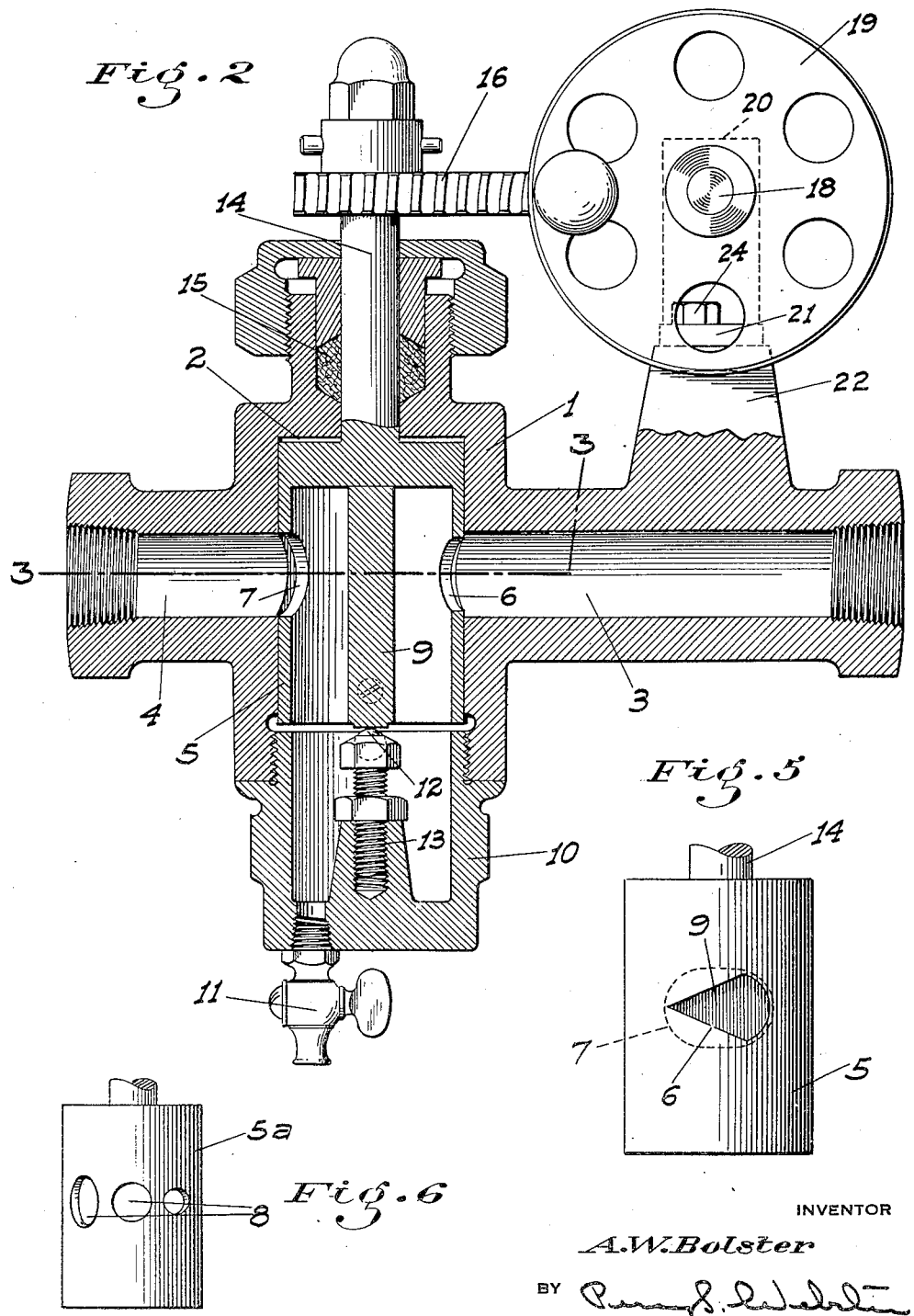

Patented Feb. 20, 1934

1,947,637

UNITED STATES PATENT OFFICE 1,947,637

CONTROL VALVE

Albert W. Bolster, Placerville, Calif., assignor of two-thirds to Mrs. M. J. Taylor, Placerville, Calif.

Application August 4, 1930. Serial No. 473,025

1 Claim. (Cl. 251—101)

This invention relates to valves, and especially to valves of that character used to control the flow of liquids such as hydrocarbon fuel oils, and in which accuracy of adjustment is necessary to enable the desired volumetric flow of the liquids passing through the valve to be properly regulated to a nicety.

Needle valves are usually employed for this purpose, and while such valves may theoretically be set so as to control the flow with great accuracy, it usually occurs in practice that it is hard if not impossible to maintain such accuracy for any length of time, especially when the usual relatively heavy and viscous fluids such as fuel oils are being conducted. This is because the needle controlled passage is very small and it is very easily clogged by any foreign matter or impurities in the fluid and there is no way to eliminate the consequent choking up of the passage other than by relieving the restriction temporarily by opening the valve. The ordinary taper plug type of valve, while simple, is not suitable for the purpose, since its inherent construction is such that if it is reasonably tight as far as leakage is concerned it offers too much resistance to turning to enable the desired accuracy of setting to be attained, especially if the valve is connected to an automatic control apparatus, as is sometimes desirable.

The principal objects of my present invention are to provide a valve for the purpose so constructed as to eliminate the objectionable features and retain the advantages of both the above named types of valve; which can be easily and accurately adjusted with a minimum of frictional resistance whether operating at normal or relatively high temperatures; one having a simple control mechanism which enables the valve to be very accurately set either by hand or automatically; one which will not clog up at any setting even when foreign matter of considerable quantity is present in the liquid passing into the valve; one which may be easily flushed if necessary without dismantling the structure, and one which will have a long life without affecting the sensitiveness of adjustment or the corresponding control of the volumetric flow.

The valve as intimated is particularly intended and suitable for controlling the flow of liquid fuel oil to oil burners, and has in fact been actually in service in connection with the burner of a rotary lime kiln; showing in such service a saving of five gallons of oil per ton of lime over any type of valve previously used, and in addition enabling a much better heat control of the furnace to be obtained.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views;

Fig. 1 is a top plan view of my improved valve.

Fig. 2 is a sectional elevation of the same.

Fig. 3 is a sectional plan on the line 3—3 of Fig. 2 showing the plug in its fully open position.

Fig. 4 is a similar view showing the plug in a nearly closed position.

Fig. 5 is a side elevation of one form of plug detached.

Fig. 6 is a similar view of a modified form of plug.

Referring now more particularly to the characters of reference on the drawings, the valve comprises a jaw 1 having a vertical cylinder bore 2, and opposed horizontal intake and outlet passages 3 and 4 leading to and from said bore respectively. The plug 5 of the valve is cylindrical and is freely turnable in the bore, and is also vertically slidable to a limited extent. This plug is a hollow member closed on its top but freely open on the bottom. The side wall of the plug, in the form shown in Figs. 1 to 5, is provided with a pair of opposed intake and outlet ports 6 and 7, to register with the corresponding ends of the passages 3 and 4 respectively. The port 6 is substantially triangular in form, with its sides extending circumferentially of the plug. The opening 7 is of oval or oblong form, elongated circumferentially of the plug. The triangular form of the opening 6 and its disposition relative to the circumference of the plug, when cooperating with the adjacent end of the passage 3, of course enables a very accurate and sensitive regulation of the volumetric flow of a liquid passing therethrough to be obtained. In the type of plug 5a shown in Fig. 6 a row of circumferentially spaced ports 8 of different sizes is provided, so that an opening of a size suitable for the particular consistency of a liquid being conducted may be employed. Other port arrangements may also be provided in other plugs as different conditions of use may render advisable.

Secured inside the plug and extending from top to bottom of the same in a plane diametrally opposed to the plane of the ports is a baffle 9. This baffle may be solid as shown, or it may be of perforated or screen construction, as may be best or most suitable for different conditions. This baffle if solid of course diverts the liquid from a straight course between the ports 6 and 7 and causes the liquid to pass around the bottom of the baffle. If any foreign matter is in the liquid therefore such matter will be prevented from flowing to the outlet port and thence to the burner or the like, whose operation the valve controls, since such matter of course will tend to remain at the bottom of the plug once it has been directed to that location. To catch and retain such foreign matter in the path of the normal flow of the liquid I have provided a relatively deep bottom cap 10 which is removably mounted on the bottom of the body and which serves as a sump or settling cavity, having of course free communication with the open bottom of the plug.

A drain cock 11 depends from the cap to enable any settled matter or impurities to be easily drawn off. If a quicker or more thorough flushing of the cap and valve as a whole is desired the cap may be easily removed to enable this operation to be carried out.

The baffle also serves as a post or bearing for engagement with the upper surface of a hardened steel ball 12 which is turnably socketed in a vertically adjustable stem 13 mounted centrally in the cap or in axial alinement with the axis of the plug. The ball supports the weight of the plug and parts attached thereto, and being adjustable enables the level of the plug to be accurately regulated relative to the body passages. This ball being an antifriction member it offers little resistance to the turning of the plug, a feature which is aided by the true cylindrical form of the plug, since any tendency of the plug to bind in its bore, as is the case with the usual taper form, is of course avoided.

A stem 14 is fixed with and projects upwardly from the plug, being engaged intermediate its ends by a packing gland 15 of standard character provided on the upper end of the body. The cylindrical form of the plug and the ball support, with the consequent freedom of rotation of the plug at all times, makes possible the use of a stem of relatively small diameter without sacrifice of the necessary strength. This in turn enables a small packing gland to be used so that the frictional gland action is reduced, which makes the plug very adaptable to sensitive manual or automatic control. The plug is of a different metal from the body and is of a relative nature which has a lesser expansion with heat than the body metal. To this end, the body may be made of brass or bronze, and the plug of iron or steel. Freezing of the plug in the body when operating with heated liquids, or when the valve is disposed in a heated zone is therefore avoided.

What amounts to a micrometer setting of rotation of the plug is provided as follows:

Fixed on the upper end of the stem is a segmental worm wheel engaged by a worm 17. This worm is mounted on a horizontal shaft 18 which preferably extends transversely of and above the passage 3 and is provided at one end with a hand wheel 19 whereby it may be easily rotated. This shaft is journaled in bearing blocks 20 upstanding from a horizontal base plate 21 which rests on a pad 22 formed on the bottom. The plate 21 is swivelly connected at one end to the pad as by a screw 23 and is adapted to swivel horizontally about said screw as an axis, so that the worm may be moved substantially laterally of the wheel away from the same and out of engagement with the teeth thereof whenever desired.

The plate 21 is normally held against such movement by a clamping screw 24 or the like mounted on the pad and adapted to frictionally engage the plate adjacent its end opposite the pivot 23. The worm wheel adjacent its rim is preferably provided with a series of graduations as indicated at 25 which read against a pointer 26 fixed in connection with the body. The operator will of course know either from a chart or from experience just to what extent the valve is opened when the pointer reads against any given graduation.

If it is desired to change the plug for another one at any time it is only necessary to disconnect the worm wheel from the stem 14, and remove the bottom cap 10, whereupon the plug can be drawn and removed from the lower end of the body.

From the foregoing description it will be readily seen that I have produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A valve comprising a casing having a vertical bore open at the lower end and closed at its upper end such bore being of the same diameter for its full length, the casing having an inlet and outlet passage connected with such bore, a cylindrical plug of the same diameter from end to end and freely turnable in the bore, the plug having openings adapted to register with the inlet and outlet passages of the bore, a division plate within the plug extending to a point adjacent its lower end whereby liquid entering the plug from the inlet must pass around the plate to reach the outlet, a removable sump cap mounted on the casing below the plug, antifriction means carried by the cap and engaging the division plate to support the plug in the bore.

ALBERT W. BOLSTER.